United States Patent
Launois et al.

(10) Patent No.: US 9,951,706 B2
(45) Date of Patent: Apr. 24, 2018

(54) CALIBRATION STRATEGIES TO IMPROVE SPINEL MIXED METAL OXIDES CATALYTIC CONVERTERS

(71) Applicant: Clean Diesel Technologies, Inc., Oxnard, CA (US)

(72) Inventors: Maxime Launois, Massy (FR); Zahra Nazarpoor, Camarillo, CA (US); Stephen J. Golden, Santa Barbara, CA (US)

(*) Notice: Subject to any disclaimer, the term of this patent is extended or adjusted under 35 U.S.C. 154(b) by 192 days.

(21) Appl. No.: 14/692,577

(22) Filed: Apr. 21, 2015

(65) Prior Publication Data
US 2016/0312730 A1    Oct. 27, 2016

(51) Int. Cl.
*F02D 41/08* (2006.01)
*F02D 41/24* (2006.01)
(Continued)

(52) U.S. Cl.
CPC ........... *F02D 41/2432* (2013.01); *F01N 3/28* (2013.01); *F02D 41/08* (2013.01);
(Continued)

(58) Field of Classification Search
CPC ............. F02D 41/2432; F02D 41/2451; F02D 41/2458; F02D 41/08; G01M 15/04
See application file for complete search history.

(56) References Cited

U.S. PATENT DOCUMENTS

| | | |
|---|---|---|
| 4,454,846 A | 6/1984 | Suzuki et al. |
| 4,594,984 A | 6/1986 | Raff et al. |

(Continued)

FOREIGN PATENT DOCUMENTS

| | | |
|---|---|---|
| EP | 1 327 759 | 7/2003 |
| WO | WO 90/07561 | 7/1990 |

(Continued)

OTHER PUBLICATIONS

DieselNet Technology Guid, Emission Control Catalysts, "Catalytic Coating & Materials", Jun. 2006, https://www.dieselnet.com/tech/cat_mat.php.*

(Continued)

*Primary Examiner* — Kevin A Lathers
(74) *Attorney, Agent, or Firm* — Thaddius J. Carvis

(57) ABSTRACT

Modified calibration strategies for controlling an internal combustion engine and monitoring catalyst performance are disclosed. The modified calibration strategies are implemented using an engine and test cell/catalyst chamber setup wherein the engine is a Euro V 1.2 L turbo gasoline direct injection engine and test cells/catalyst chamber are implemented as substantially free of platinum group metals (PGM) catalysts, herein referred as ZPGM catalysts, and synergized PGM (SPGM) catalysts including a stoichiometric spinel structure within the catalyst configuration. The utilization of an open ECU enables the modified calibration of the engine out targeted AFR. The conventional ECU AFR control strategies are not modified to have the ECU AFR control strategies to continue running normally and only the final engine out targeted AFR values are modified by applying offset AFR values. The modified calibration strategies improve engine operation and catalyst conversion efficiency of the ZPGM and SPGM catalysts including the spinel structures.

20 Claims, 11 Drawing Sheets

(51) Int. Cl.
  *G01M 15/10* (2006.01)
  *F01N 3/28* (2006.01)
  *F02D 41/14* (2006.01)
(52) U.S. Cl.
  CPC ..... *F02D 41/1475* (2013.01); *F02D 41/2461* (2013.01); *G01M 15/104* (2013.01); *F01N 2510/0684* (2013.01); *F02D 41/1441* (2013.01); *F02D 41/1446* (2013.01); *F02D 41/1456* (2013.01); *F02D 2250/36* (2013.01)

(56) References Cited

U.S. PATENT DOCUMENTS

| | | |
|---|---|---|
| 4,629,472 A | 12/1986 | Haney, III et al. |
| 4,891,050 A | 1/1990 | Bowers et al. |
| 4,892,562 A | 1/1990 | Bowers et al. |
| 5,034,020 A | 7/1991 | Epperly et al. |
| 5,168,836 A | 12/1992 | Kraus |
| 5,203,166 A | 4/1993 | Miller |
| 5,266,083 A | 11/1993 | Peter-Hoblyn et al. |
| 5,404,841 A | 4/1995 | Valentine |
| 5,501,714 A | 3/1996 | Valentine et al. |
| 5,535,708 A | 7/1996 | Valentine |
| 5,584,894 A | 12/1996 | Peter-Hoblyn et al. |
| 5,693,106 A | 12/1997 | Peter-Hoblyn et al. |
| 5,732,548 A | 3/1998 | Peter-Hoblyn et al. |
| 5,743,922 A | 4/1998 | Peter-Hoblyn et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn et al. |
| 5,868,421 A | 2/1999 | Eyrainer |
| 5,918,583 A | 7/1999 | Fukumasu et al. |
| 5,921,080 A | 7/1999 | Ulmet et al. |
| 5,924,280 A | 7/1999 | Tarabulski |
| 5,939,354 A | 8/1999 | Golden |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,151,547 A * | 11/2000 | Kumar ............... G01M 15/102 60/274 |
| 6,203,770 B1 | 3/2001 | Peter-Hoblyn et al. |
| 6,279,603 B1 | 8/2001 | Czarnik et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,531,425 B2 | 3/2003 | Golden |
| 6,948,926 B2 | 9/2005 | Valentine et al. |
| 7,014,825 B2 | 3/2006 | Golden |
| 7,473,288 B2 | 1/2009 | Toyoda et al. |
| 7,527,776 B2 | 5/2009 | Golden et al. |
| 7,641,875 B1 | 1/2010 | Golden |
| 8,323,601 B2 | 12/2012 | Justic et al. |
| 8,802,582 B2 | 8/2014 | Malyala et al. |
| 8,845,987 B1 | 9/2014 | Nazarpoor et al. |
| 8,853,121 B1 | 10/2014 | Nazarpoor et al. |
| 9,216,410 B2 | 12/2015 | Hatfield |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2004/0098905 A1 | 5/2004 | Valentine et al. |
| 2004/0172876 A1 | 9/2004 | Sprague et al. |
| 2005/0132674 A1 | 6/2005 | Toyoda et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0217751 A1 | 10/2005 | Valentine et al. |
| 2006/0081922 A1 | 4/2006 | Golden |
| 2006/0120936 A1 | 6/2006 | Alive et al. |
| 2006/0166816 A1 | 7/2006 | Zhang et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2006/0260294 A1 | 11/2006 | Sczomak et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0304566 A1 | 12/2009 | Golden et al. |
| 2009/0324468 A1 | 12/2009 | Golden et al. |
| 2009/0324469 A1 | 12/2009 | Golden et al. |
| 2010/0240525 A1 | 9/2010 | Golden et al. |
| 2010/0316545 A1 | 12/2010 | Alive et al. |
| 2010/0316547 A1 | 12/2010 | Justic et al. |
| 2011/0239626 A1 | 10/2011 | Makkee et al. |
| 2012/0183447 A1 | 7/2012 | Kwan et al. |
| 2013/0115144 A1 | 5/2013 | Golden et al. |
| 2013/0236380 A1 | 9/2013 | Golden et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor |
| 2015/0005159 A1 | 1/2015 | Nazarpoor et al. |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |

(56) References Cited

U.S. PATENT DOCUMENTS

| | | |
|---|---|---|
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor et al. |
| 2015/0182954 A1 | 7/2015 | Nazarpoor et al. |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0316524 A1 | 11/2015 | Hatfield |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor et al. |
| 2016/0030885 A1 | 2/2016 | Hatfield |
| 2016/0047751 A1 | 2/2016 | Pless et al. |
| 2016/0082422 A1 | 3/2016 | Nazarpoor et al. |
| 2016/0121304 A1 | 4/2016 | Nazarpoor et al. |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |
| 2016/0167023 A1 | 6/2016 | Nazarpoor et al. |
| 2016/0167024 A1 | 6/2016 | Nazarpoor et al. |
| 2016/0263526 A1 | 9/2016 | Golden |
| 2016/0263561 A1 | 9/2016 | Nazarpoor et al. |
| 2016/0312730 A1 | 10/2016 | Launois et al. |
| 2016/0346765 A1 | 12/2016 | Nazarpoor et al. |
| 2016/0354765 A1 | 12/2016 | Hatfield et al. |
| 2016/0361710 A1 | 12/2016 | Nazarpoor et al. |
| 2016/0361711 A1 | 12/2016 | Nazarpoor et al. |

FOREIGN PATENT DOCUMENTS

| | | |
|---|---|---|
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/085876 A1 | 11/2001 |
| WO | WO 03/068363 A1 | 8/2003 |
| WO | WO 2004/058641 A1 | 7/2004 |
| WO | WO 2005/054651 | 6/2005 |
| WO | WO 2009/139860 A1 | 11/2009 |
| WO | WO 2011/068509 A1 | 6/2011 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |
| WO | WO 2016/203371 | 12/2016 |

OTHER PUBLICATIONS

International Search Report and Written Opinion for corresponding International Application No. PCT/IB2016/052142, dated Jul. 28, 2016.

* cited by examiner

CALIBRATION STRATEGIES TO IMPROVE SPINEL MIXED METAL OXIDES CATALYTIC CONVERTERS

BACKGROUND

Field of the Disclosure

The present disclosure relates generally to calibration methods for reducing engine exhaust emissions, and more particularly, to calibration methods for improving catalyst performance in three-way catalyst (TWC) applications.

Background Information

Calibrations strategies that do not require additional equipment, for example, spark control and air to fuel ratio (AFR) control, amongst others, are desirable for improving catalyst performance. Improving catalyst light-off to meet the requirements of gas emissions levels, fuel consumption levels, and exhaust equipment size requires proper calibration of internal combustion engines. Within internal combustion engines, the production of pollutant emissions during combustion and the conversion of these emissions by a catalytic converter require both a very precisely adjusted air to fuel ratio as well as catalytic material compositions capable of providing a high level of conversion efficiency.

Calibration strategies have been developed for the automotive sector that improve performance of catalysts in effectively removing exhaust pollutants. These strategies are directed toward satisfying the combined requirements of (a) meeting standard emission requirements, (b) minimizing fuel consumption, and (c) minimizing system cost including catalyst size and loadings, amongst others.

Accordingly, stricter statutory regulations for pollutant emissions make it necessary to develop catalysts, including material compositions with low platinum group metals loadings, which can enable performance synergies to reduce the pollutant emissions to as low a level as possible during operation of the internal combustion engines. Further, the use of new catalyst materials in conjunction with improved calibration strategies can achieve improved performance levels in the reduction of nitrogen oxide, unburnt hydrocarbons, and carbon monoxide emissions.

SUMMARY

The present disclosure describes completely or substantially free of platinum group metals (PGM) catalysts, herein referred as Zero PGM (ZPGM) catalysts, and synergized PGM (SPGM) catalysts including spinel structures to enable performance synergies with low levels of PGM material compositions in conventional three-way catalyst (TWC) systems. Further, the present disclosure describes improved calibration strategies applied as modified calibration strategies in addition to conventional standard calibration strategies. The modified strategies provide a calibration flexibility associated with the ZPGM and SPGM catalysts to drive enhanced performance levels and conversion efficiencies of total hydrocarbons (THC), carbon monoxide (CO), and nitrogen oxide ($NO_X$).

In some embodiments, the ZPGM catalysts are produced according to a catalyst configuration that includes a suitable substrate, a washcoat (WC) layer, and an overcoat (OC) layer. In other embodiments, the ZPGM catalysts are produced according to a catalyst configuration that includes a suitable substrate, a WC layer, an OC layer, and an impregnation (IMP) layer. The layers within these catalyst configurations for ZPGM catalysts can be produced using conventional synthesis methods.

In some embodiments, the ZPGM catalysts, herein referred as ZPGM catalysts Type A, are produced including cylindrical ceramic substrates of diameter (D) and length (L), such as, for example a 1.0 L of 400 cpsi/3.5 mil wall ceramic substrate having a D of 4.16 inches and a L of 4.50 inches. In these embodiments, the WC layers are produced using a plurality of support oxides. Examples of suitable support oxides are $MgAl_2O_4$, $Al_2O_3$—BaO, $Al_2O_3$—$La_2O_3$, $ZrO_2$—$CeO_2$—$Nd_2O_3$—$Y_2O_3$, $CeO_2$—$ZrO_2$, $CeO_2$, $SiO_2$, alumina silicate, $ZrO_2$—$Y_2O_3$—$SiO_2$, $Al_2O_3$—$CeO_2$, $Al_2O_3$—SrO, $TiO_2$-10% $ZrO_2$, $TiO_2$-10% $Nb_2O_5$, $SnO_2$—$TiO_2$, $ZrO_2$—$SnO_2$—$TiO_2$, $BaZrO_3$, $BaTiO_3$, $BaCeO_3$, $ZrO_2$—$Pr_6O_{11}$, $ZrO_2$—$Y_2O_3$, $ZrO_2$—$Nb_2O_5$, Al—Zr—Nb, and Al—Zr—La, amongst others. In an example, the WC layer is implemented as alumina ($Al_2O_3$) support oxide.

Further to these embodiments, the OC layers are produced including binary or ternary spinel compositions. Examples of suitable materials that these spinel structures can include are aluminum, magnesium, manganese, gallium, nickel, copper, silver, cobalt, iron, chromium, titanium, tin, or mixtures thereof. In another example, the OC layer is implemented as a binary spinel structure of copper (Cu) and manganese (Mn) supported on doped zirconia support oxide. In this example, the Cu—Mn spinel structure can be produced using a general formulation $Cu_xMn_{3-x}O_4$ spinel, in which X is a variable for different molar ratios. Further to this example, X is 1.0 for a $CuMn_2O_4$ stoichiometric spinel structure. Still further to this example, the Cu—Mn spinel is supported on Nb-doped zirconia (75% $ZrO_2$-25% $Nb_2O_5$) support oxide.

In other embodiments, the ZPGM catalysts, herein referred as ZPGM catalysts Type B, are produced including cylindrical ceramic substrates of diameter (D) and length (L), such as, for example a 1.0 L of 400 cpsi/3.5 mil wall ceramic substrate having a D of 4.16 inches and a length of 4.50 inches. In these embodiments, the WC layers are implemented as alumina. Further to these embodiments, the OC layers are produced using a plurality of support oxides. Examples of suitable support oxides are $MgAl_2O_4$, $Al_2O_3$—BaO, $Al_2O_3$—$La_2O_3$, $ZrO_2$—$CeO_2$—$Nd_2O_3$—$Y_2O_3$, $CeO_2$—$ZrO_2$, $CeO_2$, $SiO_2$, alumina silicate, $ZrO_2$—$Y_2O_3$—$SiO_2$, $Al_2O_3$—$CeO_2$, $Al_2O_3$—SrO, $TiO_2$-10% $ZrO_2$, $TiO_2$-10% $Nb_2O_5$, $SnO_2$—$TiO_2$, $ZrO_2$—$SnO_2$—$TiO_2$, $BaZrO_3$, $BaTiO_3$, $BaCeO_3$, $ZrO_2$—$Pr_6O_{11}$, $ZrO_2$—$Y_2O_3$, $ZrO_2$—$Nb_2O_5$, Al—Zr—Nb, and Al—Zr—La, amongst others. In an example, the OC layer is implemented as Pr-doped zirconia support oxide, preferably, 90% $ZrO_2$-10% $Pr_6O_{11}$.

In these embodiments, the ZPGM catalysts Type B includes an IMP layer impregnated onto the OC layer. Further to these embodiments, the IMP layer can be produced including binary or ternary spinel compositions. Examples of suitable materials that these spinel structures can include are aluminum, magnesium, manganese, gallium, nickel, copper, silver, cobalt, iron, chromium, titanium, tin, or mixtures thereof. In another example, the IMP layer is implemented as a binary spinel structure of copper (Cu) and manganese (Mn). In this example, the Cu—Mn spinel structure can be produced using a general formulation $Cu_xMn_{3-x}O_4$ spinel, in which X is a variable for different molar ratios. Further to this example, X is 1.0 for a $CuMn_2O_4$ stoichiometric spinel structure.

In some embodiments, the SPGM catalysts are produced adding a second OC layer of PGM material compositions to the catalyst configurations used to produce the ZPGM catalysts. In these embodiments, the second OC layer within the SPGM catalysts can be produced including different PGM catalyst materials supported on alumina. Examples of suitable PGM material compositions within the second OC layer can include platinum (Pt), palladium (Pd), ruthenium (Ru), iridium (Ir), and rhodium (Rh), either by themselves, or in combinations thereof of different loadings. Further to these embodiments, the range of PGM loadings can vary from about 1 g/ft$^3$ to about 10 g/ft$^3$.

In some embodiments, SPGM catalysts, herein referred as SPGM catalysts Type A, are produced adding a second OC layer of PGM material composition of Pt and Rh. In these embodiments, the second OC layer is implemented as about 5 g/ft$^3$ Pt and about 5 g/ft$^3$ Rh supported on alumina support oxide. Further to these embodiments, the support oxide of alumina is metallized with the PGM composition to produce the OC layer.

In other embodiments, the SPGM catalysts, herein referred as SPGM catalysts Type B, are produced adding a second OC layer of PGM material composition of Pd. In these embodiments, the second OC layer is implemented as about 6 g/ft$^3$ Pd supported on alumina support oxide. Further to these embodiments, the support oxide of alumina is metallized with the PGM composition to produce the OC layer.

In further embodiments, PGM reference catalysts are produced using conventional synthesis methods. In these embodiments, the PGM reference catalysts are implemented as Pd only, with loadings of about 20 g/ft$^3$, for a commercial close-coupled TWC with conventional Ceria-based oxygen storage material.

In some embodiments, engine testing is conducted using a Euro V 1.2 L turbo gasoline direct injection (TGDI) engine equipped with an open engine control unit (ECU). In these embodiments, the engine is equipped with fast cooling capabilities to enable a series of tests and all catalyst samples employed are placed in close-coupled locations. Further to these embodiments, prior to obtaining test measurements the engine out conditions are stabilized by performing preconditioning according to a transient drive cycle testing protocol, such as for example the New European Driving Cycle (NEDC) testing protocol, the World Harmonized Transient Cycle (WHTC), the EPA Federal Test Procedure commonly known as FTP-75, the Japanese JC08 cycle, and the like.

Still further to these embodiments, the engine and the test cells/catalyst chamber are equipped with automation and data acquisition software such as, MORPHEE which is commercially available from D2T-IFP Group Powertrain Technologies of Trappes, France, and OpenECU with calibration modification using INCA software products available from ETAS Group of Stuttgart, Germany. In these embodiments, the OpenECU development software is deployed during all phases of the engine testing for measurement data analysis and calibration data management.

In some embodiments, modified calibration strategies are provided for controlling an internal combustion engine wherein, no direct modification of catalyst inlet temperature is required because the calibration strategies are specifically directed to the engine air to fuel ratio (AFR). In these embodiments, no modification of the AFR control during the cold start open loop phase of the engine is performed during the first phase of urban driving cycle (UDC1) of the NEDC testing protocol. Further to these embodiments, the utilization of the open ECU enables the modified calibration of the engine out targeted AFR. In these embodiments, the conventional ECU AFR control strategies are not modified to have the ECU AFR control strategies to continue running normally. Further to these embodiments, only the final engine out targeted AFR values are modified by applying an offset AFR. Still further to these embodiments, the modified calibration strategies are enabled to modify the AFR settings during the idle periods during the implementation of NEDC testing protocol.

In some embodiments, the engine out targeted AFR is modified during all the idle phases when the simulated vehicle speed is zero km/h and the engine is running idle. In these embodiments, the idle lean condition values close to stoichiometric are determined at the initial portion of the NEDC testing protocol, for example, at an R-value of about −0.02 from about zero seconds to about 300 seconds. In other embodiments, the engine out targeted AFR is modified to a value slightly rich of stoichiometric condition during the remaining driving phases of the NEDC testing protocol, for example, at an R-value of about +0.02 from about 300 seconds to about 1,180 seconds.

In some embodiments, the results measured from the calibration changes conducted during the NEDC testing protocol are compared to verify that the modified calibration strategies provide improved performance levels. In these embodiments, the effect of the modified calibration strategies on $NO_X$ conversion is analyzed when the engine condition is running slightly rich after about 300 seconds and to verify improvements in conversion efficiency. Further to these embodiments, the effect of the disclosed modified calibration strategies on $NO_X$ is determined by comparing the cumulative grams of $NO_X$ conversion, measured downstream at the tail pipe, for the PGM reference catalyst and the SPGM catalysts Types B.

In other embodiments, results of the conversion efficiency of $NO_X$, CO, and THC, measured during the fourth phase of the urban driving cycle (UDC4), are compared, before and after the implementation of the modified calibration strategies, for the PGM reference catalyst and the SPGM catalysts. In further embodiments, the NEDC efficiency conversion of $NO_X$, CO, and THC, for the PGM reference catalyst, the ZPGM catalysts, and the SPGM catalysts are compared before and after the implementation of the modified calibration strategies. In these embodiments, the results are assessed at the end of the complete NEDC testing protocol. Further to these embodiments, catalytic performance is verified for the catalysts that exhibit increased performance resulting from the application of the disclosed modified calibration strategies.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
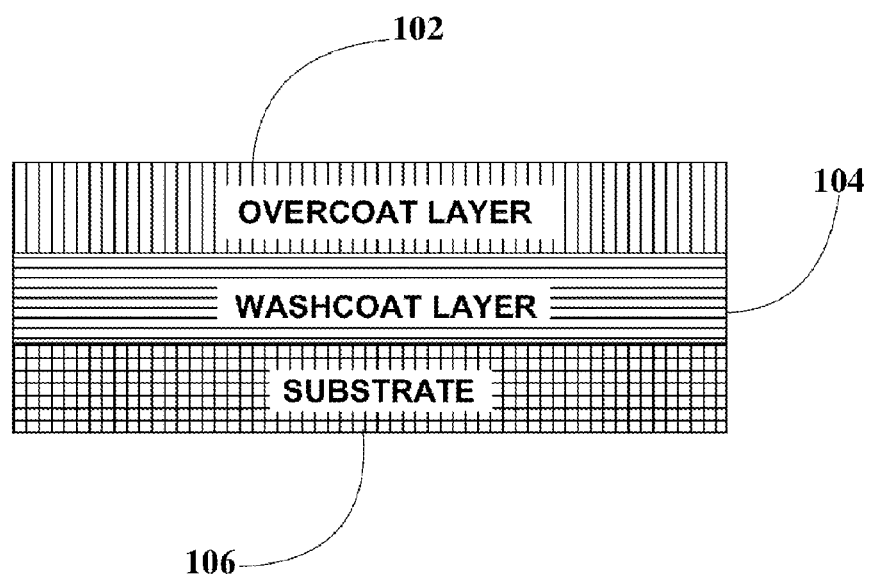
FIG. 1 is a graphical representation illustrating a catalyst configuration for zero-platinum group metals (ZPGM) catalysts, herein referred as ZPGM catalysts Type A, including a washcoat (WC) layer coated overlying a suitable substrate, and an overcoat (OC) layer overlying the WC layer, according to an embodiment.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

Definitions

As used here, the following terms have the following definitions:

"Air to fuel ratio, or A/F ratio, or AFR" refers to the mass ratio of air to fuel present in a combustion process.

"Calcination" refers to a thermal treatment process applied to solid materials, in presence of air, to bring about a thermal decomposition, phase transition, or removal of a volatile fraction at temperatures below the melting point of the solid materials.

"Calibration strategy" refers to a procedure using a map of operational parameters for controlling an internal combustion engine and monitoring the performance of a catalytic converter.

"Catalyst" refers to one or more materials that may be of use in the conversion of one or more other materials.

"Catalytic activity" refers to the percentage of conversion of pollutants of interest in a catalytic converter.

"Catalytic converter" refers to a vehicle emissions control device that converts toxic pollutants in exhaust gas to less toxic pollutants by catalyzing a redox reaction (oxidation or reduction).

"Catalyst system" refers to any system including a catalyst, such as, a PGM catalyst or a ZPGM catalyst of at least two layers comprising a substrate, a washcoat and/or an overcoat.

"Close-coupled catalyst" refers to a catalyst located in close proximity to the exhaust manifold of the engine and reduces cold-engine emissions by burning off hydrocarbons from the extra-rich mixture used to start a cold engine.

"Conversion" refers to the chemical alteration of at least one material into one or more other materials.

"Engine control unit or ECU" refers to any embedded systems that controls one or more of the engine systems or subsystems in a motor vehicle.

"Impregnation" refers to the process of imbuing or saturating a solid layer with a liquid compound or the diffusion of some element through a medium or substance.

"Lean condition" refers to an exhaust gas condition with an R value less than 1

"Metallizing" refers to the process of coating metal on the surface of metallic or non-metallic objects.

"Milling" refers to the operation of breaking a solid material into a desired grain or particle size.

"Overcoat layer" refers to a catalyst layer of at least one coating that can be deposited onto at least one washcoat layer or impregnation layer.

"Platinum group metals (PGM)" refers to platinum, palladium, ruthenium, iridium, osmium, and rhodium.

"R value" refers to the value obtained by dividing the stoichiometric AFR by the engine out AFR at a point in time.

"Rich condition" refers to an exhaust gas condition with an R value greater than 1.

"Spinel" refers to any minerals of the general formulation $AB_2O_4$ where the A ion and B ion are each selected from mineral oxides, such as, magnesium, iron, zinc, manganese, aluminum, chromium, or copper, amongst others.

"Substrate" refers to any material of any shape or configuration that yields a sufficient surface area for depositing a washcoat layer and/or an overcoat layer.

"Support oxide" refers to porous solid oxides, typically mixed metal oxides, which are used to provide a high surface area which aids in oxygen distribution and exposure of catalysts to reactants such as $NO_x$, CO, and hydrocarbons.

"Synergized PGM (SPGM) catalyst" refers to a PGM catalyst system which is synergized by a ZPGM compound under different configuration.

"Synthesis method" refers to a process by which chemical reactions occur to form a catalyst from different precursor materials.

"Three-Way Catalyst" refers to a catalyst able to perform the three simultaneous tasks of reduction of nitrogen oxides to nitrogen and oxygen, oxidation of carbon monoxide to carbon dioxide, and oxidation of unburnt hydrocarbons to carbon dioxide and water.

"Washcoat layer" refers to a catalyst layer of at least one coating, including at least one oxide solid that can be deposited onto a substrate.

"Zero PGM (ZPGM) catalyst" refers to a catalyst completely or substantially free of platinum group metals.

DESCRIPTION OF THE DRAWINGS

The present disclosure is directed to modified calibration strategies to improve catalytic conversions of completely or substantially free of platinum group metals (PGM) catalysts. These catalysts are referred to as Zero PGM (ZPGM) catalysts and synergized PGM (SPGM) catalysts, which are produced according to catalyst configurations and include spinel structures of mixed metal oxides.

ZPGM Catalyst Configurations, Material Compositions, and Production

In some embodiments, ZPGM catalysts are produced according to a catalyst configuration including a suitable substrate, a washcoat (WC) layer, and an overcoat (OC) layer. In other embodiments, ZPGM catalysts are produced according to a catalyst configuration including a suitable substrate, a WC layer, an OC layer, and an impregnation (IMP) layer. The layers in these catalyst configurations for ZPGM catalysts can be produced using conventional synthesis methods.

FIG. 1 is a graphical representation illustrating a catalyst configuration for zero-platinum group metals (ZPGM) catalysts, herein referred as ZPGM catalysts Type A, according to an embodiment. In FIG. 1, catalyst configuration 100 includes OC layer 102, WC layer 104, and substrate 106.

In some embodiments, WC layer 104 is coated onto substrate 106, and OC layer 102 is coated onto WC layer 104. In these embodiments, WC layer 104 is implemented as a support oxide, OC layer 102 is implemented as a spinel composition on a support oxide, and substrate 106 is implemented as a cylindrical ceramic substrate of diameter (D) and length (L), such as, for example a 1.0 L of 400 cpsi/3.5 mil wall ceramic substrate having a D of 4.16 inches and a L of 4.50 inches.

Further to these embodiments, the WC layers are produced using a plurality of support oxides. Examples of suitable support oxides are $MgAl_2O_4$, $Al_2O_3$—BaO, $Al_2O_3$—$La_2O_3$, $ZrO_2$—$CeO_2$—$Nd_2O_3$—$Y_2O_3$, $CeO_2$—$ZrO_2$, $CeO_2$, $SiO_2$, alumina silicate, $ZrO_2$—$Y_2O_3$—$SiO_2$, $Al_2O_3$—$CeO_2$, $Al_2O_3$—SrO, $TiO_2$-10% $ZrO_2$, $TiO_2$-10% $Nb_2O_5$, $SnO_2$—$TiO_2$, $ZrO_2$—$SnO_2$—$TiO_2$, $BaZrO_3$, $BaTiO_3$, $BaCeO_3$, $ZrO_2$—$Pr_6O_{11}$, $ZrO_2$—$Y_2O_3$, $ZrO_2$—$Nb_2O_5$, Al—Zr—Nb, and Al—Zr—La, amongst others. In an example, WC layer 104 is implemented as alumina ($Al_2O_3$) support oxide.

Still further to these embodiments, the OC layers are produced including binary or ternary spinel compositions. Examples of suitable materials that these spinel structures can include are aluminum, magnesium, manganese, gallium, nickel, copper, silver, cobalt, iron, chromium, titanium, tin, or mixtures thereof. In another example, OC layer 102 is implemented as a binary spinel structure of copper (Cu) and manganese (Mn) supported on doped zirconia support oxide, preferably, $CuMn_2O_4$ stoichiometric spinel structure supported on Nb-doped zirconia (75% $ZrO_2$-25% $Nb_2O_5$) support oxide.

In these embodiments, the production of the ZPGM catalyst Type A begins with the mixing of $Al_2O_3$ with water and subsequently milling the mixture to produce an aqueous slurry. Further to these embodiments, the slurry of alumina is coated onto substrate 106, with loading of about 120 g/L, and further dried and calcined at about 550° C. for about 4 hours to form WC layer 104.

Still further to these embodiments, OC layer 102 is separately produced by milling Nb-doped zirconia support oxide with water to produce an aqueous slurry of Nb-doped zirconia. In these embodiments, the Cu—Mn spinel structure is produced by mixing the appropriate amounts of Mn nitrate solution, Cu nitrate solution, and water to make solution at appropriate molar ratio for $CuMn_2O_4$ stoichiometric spinel composition, according to formulation $Cu_XMn_{3-X}O_4$, in which X is 1.0. Further to these embodiments, the stoichiometric Cu—Mn spinel composition is then mixed with the aqueous slurry of Nb-doped zirconia for a period of time, from about 2 hours to about 4 hours, and precipitated with a base solution. Still further to these embodiments, examples of a suitable base solution to precipitate the Cu—Mn spinel composition and the Nb-doped zirconia slurries are an appropriate amount of one or more of: sodium hydroxide (NaOH) solutions; sodium carbonate ($Na_2CO_3$) solution; ammonium hydroxide ($NH_4OH$) solution; tetraethyl ammonium hydroxide (TEAH) solution; and any other suitable base solutions.

In these embodiments, the precipitated mixture slurry of Cu—Mn spinel composition with Nb-doped zirconia support oxide is aged for a period of time, such as, from about 12 hours to about 24 hours under continued stirring at room temperature. Further to these embodiments, the aged mixture slurry of Cu—Mn spinel composition and Nb-doped zirconia is coated onto WC layer 104, with loading of about 120 g/L, and further calcined at about 600° C. for about 5 hours to form OC layer 102.

Figure 2:
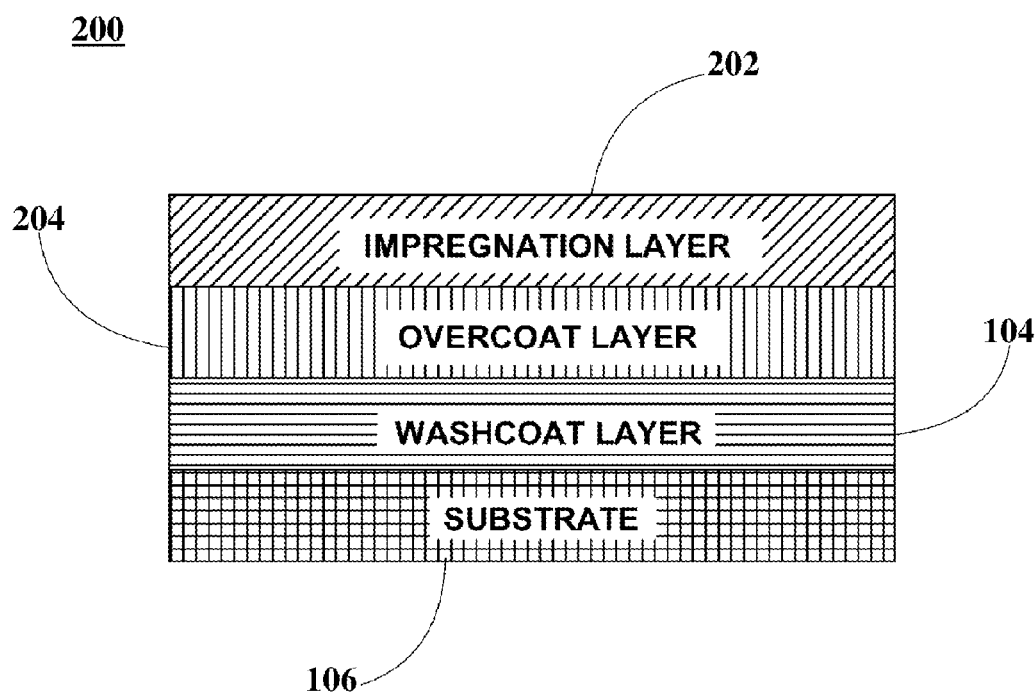
FIG. 2 is a graphical representation illustrating a catalyst configuration for ZPGM catalysts, herein referred as ZPGM catalysts Type B, including a WC layer coated overlying a suitable substrate, an OC layer overlying the WC layer, and an impregnation (IMP) layer impregnated onto the OC layer, according to an embodiment.

FIG. 2 is a graphical representation illustrating a catalyst configuration for ZPGM catalysts, herein referred as ZPGM catalysts Type B, according to an embodiment. In FIG. 2, catalyst configuration 200 includes impregnation (IMP) layer 202, OC layer 204, WC layer 104, and substrate 106. In FIG. 2, elements having identical element numbers from previous figures perform in a substantially similar manner.

In some embodiments, WC layer 104 is coated onto substrate 106, OC layer 204 is coated onto WC layer 104, and IMP layer 202 is impregnated onto OC layer 204. In these embodiments, WC layer 104 is implemented as alumina support oxide, OC layer 204 is implemented as a support oxide, IMP layer 202 is implemented as a spinel composition, and substrate 106 is implemented as a cylindrical ceramic substrate of diameter (D) and length (L), such as, for example a 1.0 L of 400 cpsi/3.5 mil wall ceramic substrate having a D of 4.16 inches and a length of 4.50 inches.

Further to these embodiments, the OC layers are produced using support oxides, as described for the WC layers illustrated in FIG. 1. In an example, OC layer 204 is implemented as Pr-doped zirconia (90% $ZrO_2$-10% $Pr_6O_{11}$).

Still further to these embodiments, the OC layers are produced including binary or ternary spinel compositions, as described for the OC layers illustrated in FIG. 1. In another example, OC layer 204 is implemented as a binary spinel structure of copper (Cu) and manganese (Mn), preferably, a $CuMn_2O_4$ stoichiometric spinel structure.

In these embodiments, the production of the ZPGM catalyst Type B begins with the mixing of $Al_2O_3$ with water and subsequently milling the mixture to produce an aqueous slurry. Further to these embodiments, the slurry of alumina is coated onto substrate 106, with loading of about 120 g/L, and further dried and calcined at about 550° C. for about 4 hours to form WC layer 104.

Still further to these embodiments, OC layer 204 is separately produced by milling Pr-doped zirconia support oxide with water to produce an aqueous slurry of Pr-doped zirconia. In these embodiments, the aqueous slurry of Pr-doped zirconia is coated onto WC layer 104, with loading of about 120 g/L, and further calcined at about 550° C. for about 4 hours to form OC layer 204.

Further to these embodiments, IMP layer 202 is produced by mixing the appropriate amount of Mn nitrate solution, Cu nitrate solution and water to make solution at appropriate molar ratio for $CuMn_2O_4$ stoichiometric spinel structure, according to general formulation $Cu_XMn_{3-X}O_4$, in which X is 1.0. In these embodiments, the Cu—Mn solution is impregnated onto OC layer 204 and further calcined at a temperature of about 600° C. for about 5 hours.

SPGM Catalyst Configurations, Material Compositions, and Production

In other embodiments, SPGM catalysts are produced adding a second OC layer of PGM material compositions to the catalyst configurations used to produce the ZPGM catalysts Types A and B. In these embodiments, the second OC layer in the SPGM catalysts can be produced including different PGM catalyst materials supported on alumina. Examples of suitable PGM material compositions in the second OC layer can include platinum (Pt), palladium (Pd), ruthenium (Ru), iridium (Ir), and rhodium (Rh), either by themselves, or in combinations thereof of different loadings. Further to these embodiments, the range of PGM loadings can vary from about 1 g/ft$^3$ to about 10 g/ft$^3$.

Figure 3:
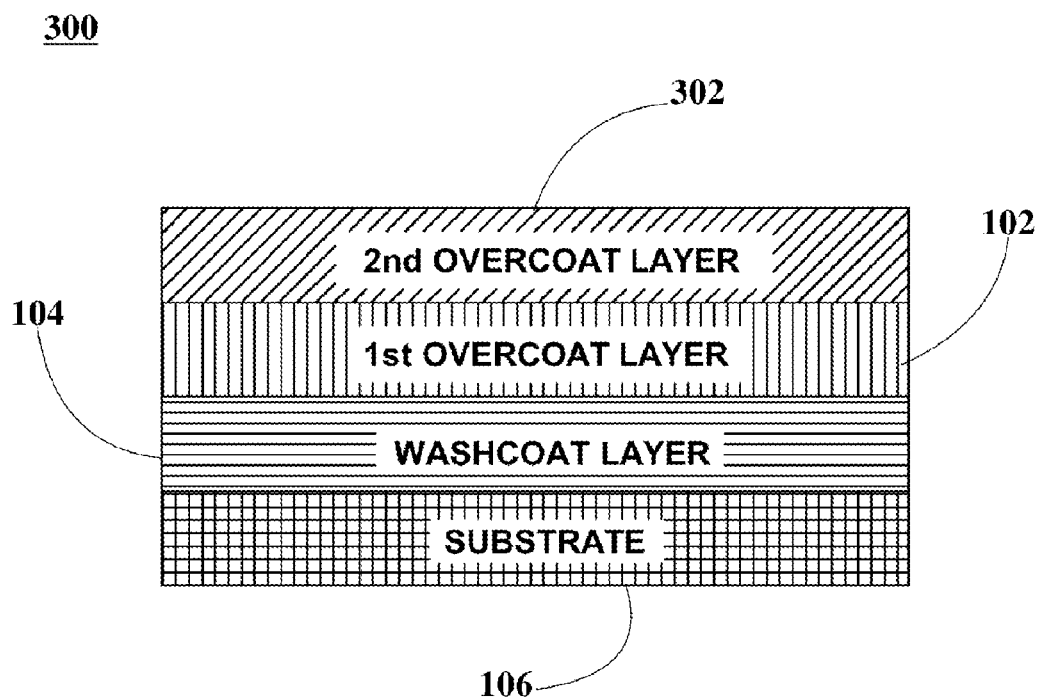
FIG. 3 is a graphical representation illustrating a catalyst configuration for synergized platinum group metals (SPGM) catalysts, herein referred as SPGM catalysts Type A, including a WC layer coated overlying a suitable substrate, a first OC layer overlying the WC layer, and a second OC layer overlying the first OC layer, according to an embodiment.

FIG. 3 is a graphical representation illustrating a catalyst configuration for SPGM catalysts, herein referred as SPGM catalysts Type A, according to an embodiment. In FIG. 3, catalyst configuration 300 includes OC layer 102, WC layer 104, and substrate 106, and second OC layer 302 coated onto OC layer 102. In FIG. 3, elements having identical element numbers from previous figures perform in a substantially similar manner.

In some embodiments, OC layer 302 is implemented as PGM material composition of Pt and Rh deposited onto a support oxide. In these embodiments, OC layer 302 is preferably implemented as about 5 g/ft$^3$ Pt and about 5 g/ft$^3$ Rh supported on an alumina support oxide.

Further to these embodiments, the production of the SPGM catalyst Type A begins by preparing a solution including a Pt nitrate solution and a Rh nitrate solution. Still further to these embodiments, alumina is separately mixed with water and subsequently the mixture is milled to produce an alumina aqueous slurry.

In these embodiments, the alumina aqueous slurry is metallized with the Pt—Rh solution by adding an appropriate base solution to the mix of the Pt—Rh solution and the alumina slurry. Examples of suitable base solutions are an appropriate amount of one or more of: a sodium hydroxide (NaOH) solution; a sodium carbonate ($Na_2CO_3$) solution; an ammonium hydroxide ($NH_4OH$) solution; a tetraethyl ammonium hydroxide (TEAH) solution; and any other suitable base solutions. Further to these embodiments, the Pt—Rh/alumina slurry is coated then onto OC layer 102 of ZPGM catalyst Type A and further calcined at about 550° C. for about 4 hours to form OC layer 302, with total loading of about 100 g/L.

Figure 4:
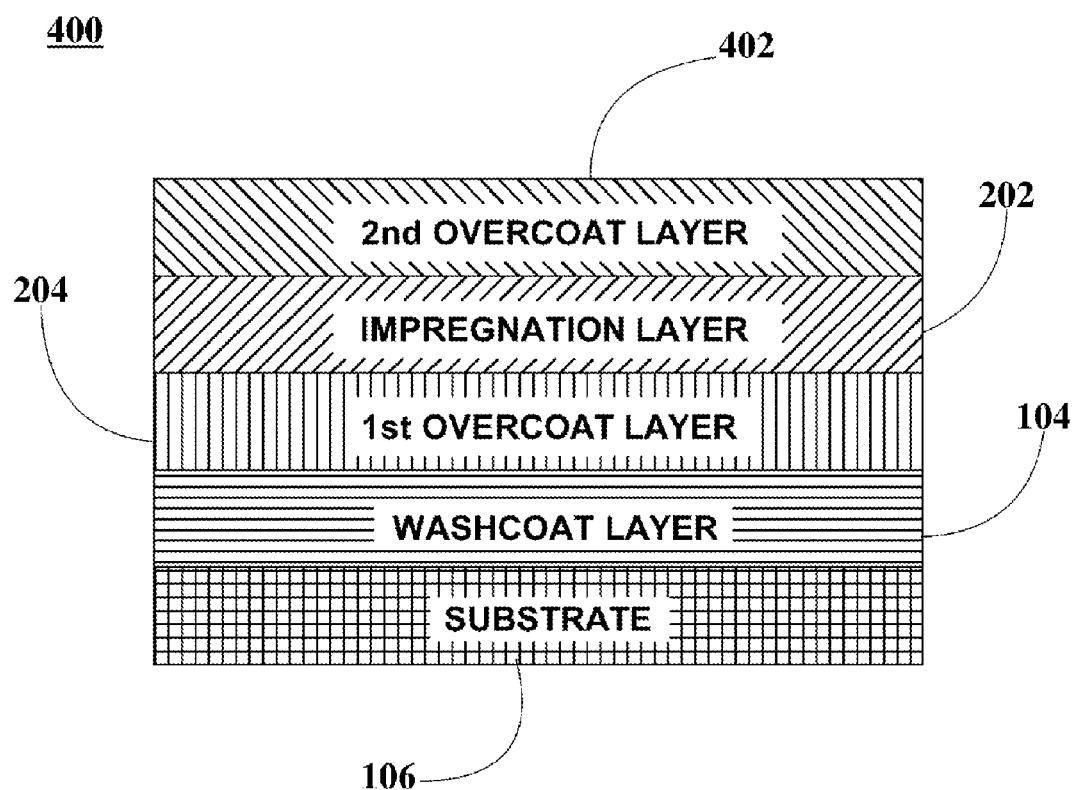
FIG. 4 is a graphical representation illustrating a catalyst configuration for SPGM catalysts, herein referred as SPGM catalysts Type B, including a WC layer coated overlying a suitable substrate, a first OC layer overlying the WC layer, an IMP layer impregnated onto the first OC layer, and a second OC layer overlying the IMP layer, according to an embodiment.

FIG. 4 is a graphical representation illustrating a catalyst configuration for SPGM catalysts, herein referred as SPGM catalysts Type B, according to an embodiment. In FIG. 4, catalyst configuration 400 includes IMP layer 202, OC layer 204, WC layer 104, and substrate 106, and second OC layer 402 coated onto OC layer 204. In FIG. 4, elements having identical element numbers from previous figures perform in a substantially similar manner.

In some embodiments, OC layer 402 is implemented as PGM material composition of Pd deposited onto support oxide. In these embodiments, OC layer 402 is preferably implemented as about 6 g/ft$^3$ Pd supported on an alumina support oxide.

Further to these embodiments, the production of the SPGM catalyst Type B begins by preparing a solution including a Pd nitrate solution. Still further to these embodiments, alumina is separately mixed with water and subsequently the mixture is milled to produce an alumina aqueous slurry.

In these embodiments, the alumina aqueous slurry is metallized with the Pd solution by adding an appropriate base solution to the mix of the Pd solution and the alumina slurry. Examples of suitable base solutions are an appropriate amount of one or more of: sodium hydroxide (NaOH) solution; sodium carbonate ($Na_2CO_3$) solution; ammonium hydroxide ($NH_4OH$) solution; tetraethyl ammonium hydroxide (TEAH) solution; and any other suitable base solutions. Further to these embodiments, the Pd/alumina slurry is then coated onto IMP layer 202 of ZPGM catalyst Type B and further calcined at about 550° C. for about 4 hours to form OC layer 402, with total loading of about 100 g/L.

PGM Reference Catalyst

In other embodiments, PGM reference catalysts are produced using conventional synthesis methods. In these embodiments, the PGM reference catalysts are specifically implemented as Pd, with loadings of about 20 g/ft$^3$, for a commercial close-coupled TWC including conventional Ceria-based oxygen storage material.

Development and Gas Dynamics of Calibration Strategies

In some embodiments, development and calibration of an engine using a gas dynamics simulation are conducted by performing steady-state and transient calibration procedures to assess improvements in catalytic conversion efficiency. These improvements are the result of the disclosed modified calibration strategies applied to the aforementioned ZPGM and SPGM catalysts. Further, the steady-state and transient calibration results from the disclosed modified calibration strategies are compared with the steady-state and transient calibration results from the PGM reference catalyst. The steady-state and transient calibration results are achieved under engine conditions established before and after the implementation of the modified calibration strategies.

Figure 5:
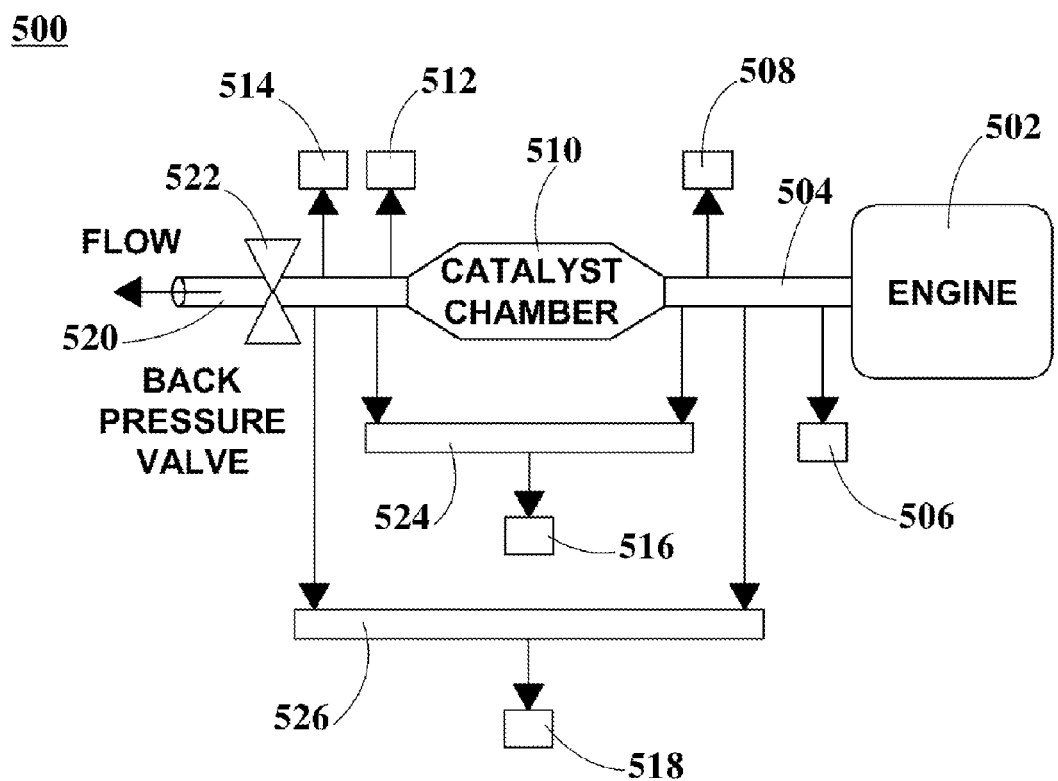
FIG. 5 is a graphical representation illustrating a system for testing an engine and a plurality of catalyst test cells/catalyst chambers (described in FIGS. 1-4) under modified calibration strategies using the New European Driving Cycle (NEDC) protocol, according to an embodiment.

FIG. 5 is a graphical representation illustrating a system for testing an engine and a plurality of catalyst test cells/catalyst chamber (described in FIGS. 1 to 4) under modified calibration strategies using the New European Driving Cycle (NEDC) protocol, according to an embodiment. In FIG. 5, engine system 500 includes, internal combustion engine 502, engine out exhaust pipe 504, temperature sensor 506, upstream oxygen sensor 508, catalyst chamber 510, smoke meter 512, downstream oxygen sensor 514, Fourier transform ultraviolet (FTUV) bench analyzer 516, gas analyzer 518, exhaust tail pipe 520, back pressure valve 522, and gas transmission lines 524 and 526.

In FIG. 5, internal combustion engine 502 is mechanically coupled to and in fluid communication with engine out exhaust pipe 504. Engine out exhaust pipe 504 is mechanically coupled to and in fluid communication with catalyst chamber 510, as well as with gas transmission lines 524 and 526, and engine out exhaust pipe 504 is additionally mechanically coupled to temperature sensor 506 and upstream oxygen sensor 508. Catalyst chamber 510 is mechanically coupled to and in fluid communication with exhaust tail pipe 520. Exhaust tail pipe 520 is mechanically coupled to and in fluid communication with back pressure valve 522 as well as with gas transmission lines 524 and 526 and downstream oxygen sensor 514, and exhaust tail pipe 520 is additionally mechanically coupled to smoke meter 512. Gas transmission line 524 is mechanically coupled to and in fluid communication with FTUV bench analyzer 516 and gas transmission line 526 is mechanically coupled to and in fluid communication with gas analyzer 518.

In some embodiments, engine 502 is implemented as a Euro V 1.2 L turbo gasoline direct injection (TGDI) engine, including 4 cylinders and 16 valves, equipped with an open engine control unit (ECU), not illustrated in FIG. 5. The properties associated with engine 502 are illustrated in Table 1, immediately below.

TABLE 1

Test engine properties.

| PROPERTY | UNIT | VALUE |
| --- | --- | --- |
| Displacement | $cm^3$ | 1,198.0 |
| Compression Ratio |  | 10:1 |
| Bore | mm | 72.0 |
| Stroke | mm | 73.2 |
| Max. Torque | Nm | 190.0 @ 2,000 rpm |
| Power | HP | 115.0 @ 2,000 rpm |

In these embodiments, engine 502 is equipped with fast cooling capabilities (not illustrated in FIG. 5) to enable a series of tests for samples inserted into catalyst chamber 510 (e.g., disclosed ZPGM and SPGM catalysts including a stoichiometric spinel structure, and the PGM reference catalyst). Further to these embodiments, catalyst chamber 510 is implemented as a close-coupled catalyst chamber. In these embodiments, prior to obtaining test measurements, the engine out conditions are stabilized by performing preconditioning according to the NEDC testing protocol. In other embodiments, one or more components, arrangements, and/or parameters are varied to conform to a transient drive cycle testing protocol differing from the NEDC testing protocol, such as for example the World Harmonized Transient Cycle (WHTC), the EPA Federal Test Procedure (commonly known as FTP-75), the Japanese JC08 cycle, and the like.

In some embodiments, the engine and the test cells/catalyst chamber are equipped with automation and data acquisition software such as, MORPHEE which is commercially available from D2T-IFP Group Powertrain Technologies of Trappes, France, and OpenECU with calibration modification using INCA software products available from ETAS Group of Stuttgart, Germany. The automation and data acquisition software and OpenECU with calibration using INCA software are not illustrated in FIG. 5. In these embodiments, the OpenECU development software is deployed during all phases of the engine testing for measurement data analysis and calibration data management.

Further to these embodiments, additional test bed equipment for automation and measurement acquisition and engine control not illustrated in FIG. 5 includes: several measurement channels, such as, for example 8 channels for measuring pressure, 8 channels for platinum resistance thermometers PT100, and 32 channels for thermocouples; temperature and hygrometry controlled intake air equipment; coolant temperature control; oil temperature control; air temperature control downstream intercooler; fuel temperature control; Emerson flow meter for fuel consumption measurement; and a loading machine (e.g., a DE 300 EC dynamometer, commercially available from D2T-IFP Group Powertrain Technologies) specified with a maximum speed of 10,000 rpm, a maximum power of 300 KW, and a maximum torque of 900 Nm.

In some embodiments, exhaust pipe 504 couples catalyst chamber 510 (including a ZPGM catalyst or a SPGM catalyst as previously described in FIGS. 1-4, or a PGM reference catalyst) to the exhaust stream of engine 502. In these embodiments, catalyst chamber 510 is monitored via upstream oxygen sensor 508 and downstream oxygen sensor 514, which are in communication with the OpenECU software and provide an indication of the presence or absence of oxygen in the upstream and downstream exhaust. Further to these embodiments, the OpenECU software receives signals from upstream and downstream oxygen sensors 508 and 514, respectively, which reflect the current operating conditions of engine 502 and catalyst chamber 510.

Still further to these embodiments, both gas oxygen sensors are implemented as universal exhaust gas oxygen sensors (UEGO), which can measure a wide range of air/fuel mixtures. In these embodiments, temperature sensor 506 is implemented as an engine lambda turbo out temperature sensor which monitors temperatures of the upstream exhaust gas from engine 502.

In some embodiments, various other sensors communicate with the OpenECU to software to facilitate control and monitoring functions needed for the development of the disclosed modified calibration strategies and to further monitor performance of catalyst chamber 510. In these embodiments, smoke meter 512 is implemented as an AVL 415S, a filter-type smoke meter, commercially available from AVL Digital of Graz, Austria, which uses the filter paper method and measures the filter smoke number (FSN). The FSN is a determined value of the soot concentration of the exhaust gas of a GDI engine.

Further to these embodiments, FTUV bench analyzer 516 is configured to measure ammonia ($NH_3$), nitrogen oxide (NO) and $NO_2$, and gas analyzer 518 is configured to measure dry values of CO, $CO_2$, $O_2$, THC, and $NO_X$. Still further to these embodiments, gas analyzer 518 includes five gas analyzers (not illustrated in FIG. 5) of which one analyzer is used for steady-state testing and two analyzers are used for transient testing under the NEDC testing protocol. In these embodiments, back pressure valve 522 is used to prevent the back flow of gases in the opposite directions of the flow from catalyst chamber 510 to tail pipe 520.

In other embodiments, the development of the calibration strategies is conducted by operating engine 502 employing NEDC testing protocol that simulate the various loadings of a passenger vehicle. In these embodiments, the engine hardware is pre-calibrated using, for example, the EURO V emissions standards specification. Further to these embodiments, engine out conditions prior to conducting the measurements test are stabilized by performing a preconditioning step before the NEDC protocol testing cycle.

Figure 6:
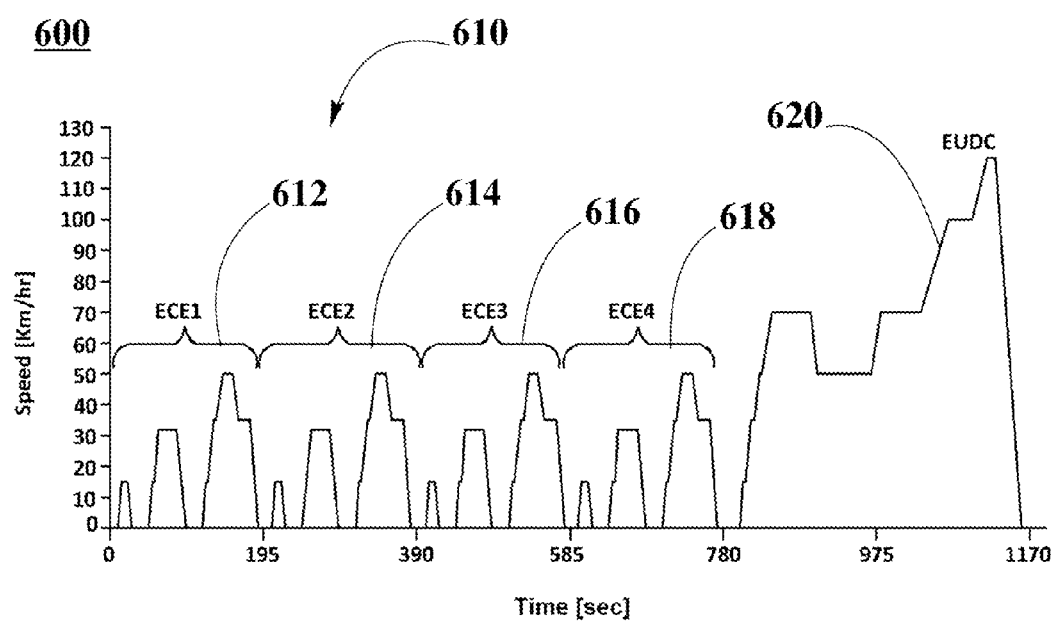
FIG. 6 is a graphical representation illustrating the driving phases of the NEDC testing protocol employed for measuring, calibrating, and diagnosing the operation and performance of the engine system of FIG. 5, according to an embodiment.

FIG. 6 is a graphical representation illustrating the driving phases of the NEDC testing protocol employed for measuring, calibrating, and diagnosing the operation and performance of the engine system of FIG. 5, according to an embodiment. In FIG. 6, NEDC test graph 600 includes urban driving cycle (UDC) phases 610 and extra-urban driving cycle (EUDC) phase 620. In some embodiments, UDC phases 610 include driving phases UDC1 612, UDC2 614, UDC3 616, and UDC4 618. In these embodiments, the total test time of UDC phases 610 and EUDC phase 620 amounts to about 1,180 seconds with an average speed of about 33.6 km/h.

Further to these embodiments, the NEDC testing protocol loading of engine 502 is performed as follows: after engine starts (UDC1 612), the engine idles for about 11 seconds and then slowly accelerates to about 15 km/h within about 4 seconds. After this period, the engine speed remains constant for about 8 seconds, which is followed by a full engine stop within about 5 seconds. Then, the engine idles for about 21 seconds. Further to this, after next idling, for about 49 seconds, the engine accelerates to about 32 km/h within about 12 seconds and remains at a constant speed for about 24 seconds, which is followed by a full stop within about 11 seconds and next idling for about 21 seconds. Still further to these embodiments, at about 117 seconds the engine accelerates to about 50 km/h within about 26 seconds and then remains at a constant speed of about 50 km/h for about 12 seconds, and then decelerates to 35 km/h within about 8 seconds maintaining a constant speed of 35 km/h for about 13 seconds. Subsequently, the engine is brought to a full stop within about 12 seconds which is followed by an idling period of about 7 seconds. UDC1 612 phase ends at about 195 seconds after a theoretical driving distance of about 994.03 meters.

In these embodiments, UDC2 614, UDC3 616, and UDC4 618 are NEDC testing protocol loading phases which follow the cycle of loading described for UDC1 612. Further to these embodiments, the total duration of UDC phases 610 is about 780 seconds over a theoretical driving distance of about 3,976.1 meters, at an average speed of about 18.35 km/h.

In other embodiments, EUDC phase 620 is implemented using high speed driving modes within a maximum speed range from about 90 km/h to about 150 km/h. In these embodiments, EUDC phase 620 begins after the UDC phases 610, and after an idling period of about 20 seconds at the end UDC4 618. Further to these embodiments, after the idling period the engine accelerates to about 70 km/h within about 41 seconds and is kept at a speed of about 70 km/h for about 50 seconds, which is followed by a deceleration to about 50 km/h within about 8 seconds. Next, the engine is kept at a constant speed of about 50 km/h for about 69 seconds, which is followed by a slow acceleration of the engine to about 70 km/h within about 13 seconds. Further to these embodiments, after the aforementioned 201 seconds the engine speed is maintained at about 70 km/h for about 50 seconds, which is followed by a slow acceleration to about 100 km/h within about 35 seconds. The engine then remains at constant speed of about 100 km/h for about 30 seconds. Subsequently, at about the 316 seconds mark the engine slowly accelerates to about 150 km/h within about 20 seconds and is maintained at a constant speed of 150 km/h for about 10 seconds, which is followed by a full engine stop within about 34 seconds. After the engine stops, the engine idles for about 20 seconds. Still further to these embodiments, the total duration of EUDC phase 620 is about 400 seconds over a theoretical driving distance of about 6,956 meters, at an average speed of about 62.6 km/h.

In some embodiments, modified calibration strategies are provided for controlling an internal combustion engine wherein, no direct modification of catalyst inlet temperature is required because the calibration strategies are specifically directed to the engine air to fuel ratio (AFR) as the main calibration parameter of engine 502. In these embodiments, no modification of the open loop phase of the engine is performed during the first phase of urban driving cycle (UDC1) of the NEDC testing protocol. Further to these embodiments, the utilization of the OpenECU software enables the modified calibration of the engine out to meet the targeted AFR. In other embodiments, the calibration strategies provided herein are applied to a transient drive cycle testing protocol differing from the NEDC testing protocol, such as for example the World Harmonized Transient Cycle (WHTC), the EPA Federal Test Procedure (commonly known as FTP-75), the Japanese JC08 cycle, and the like.

In these embodiments, the conventional OpenECU AFR control strategies are not modified to allow the OpenECU AFR control strategies to continue running normally. Further to these embodiments, only the final engine out targeted AFR values are modified by applying an offset AFR. Still further to these embodiments, the modified calibration strategies are enabled to modify the AFR settings by applying an offset AFR during the idle periods throughout the NEDC testing protocol.

In some embodiments, the engine out targeted AFR is modified via the application of an offset AFR during each of the idle phases when the simulated vehicle speed is about zero km/h and the engine is running at idle. In these embodiments, the idle lean condition values, close to stoichiometric, are determined during the initial portion of the NEDC testing protocol, for example, at an R-value of about −0.02 from about zero seconds to about 300 seconds. In other embodiments, the engine out targeted AFR is modified via the application of an offset AFR to a value slightly rich of stoichiometric condition during the remaining driving phases of the NEDC testing protocol, for example, at an R-value of about +0.02 from about 300 seconds to about 1,180 seconds.

Figure 7:
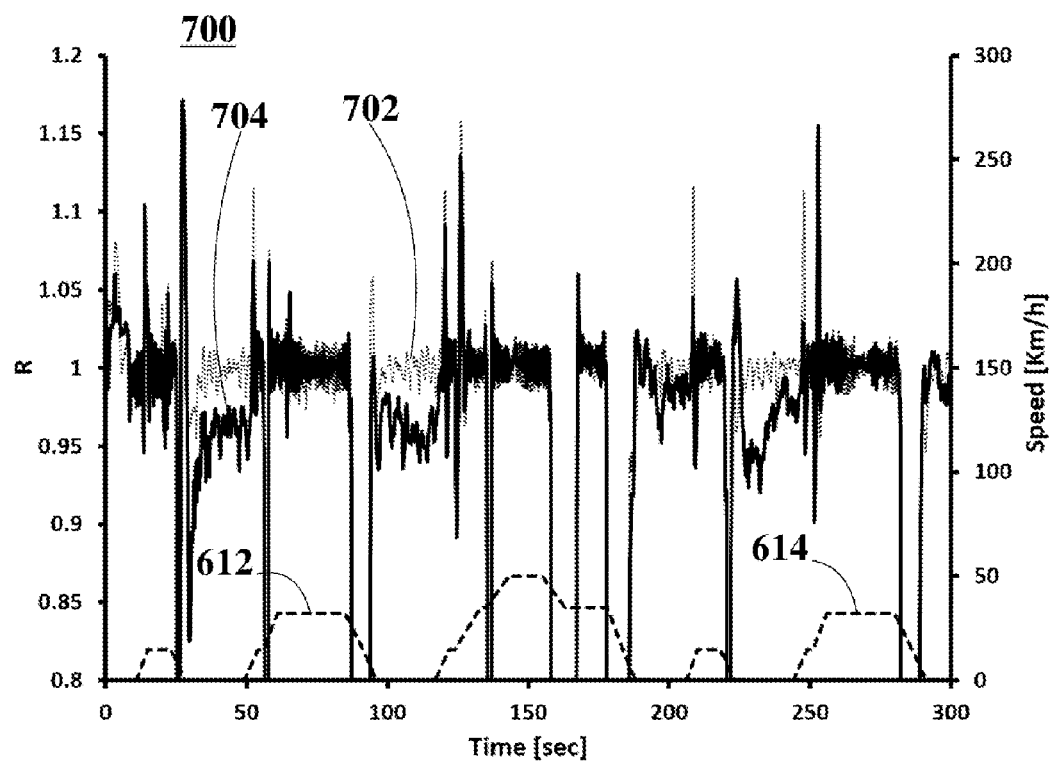
FIG. 7 is a graphical representation illustrating measurements of air to fuel ratio (AFR) variations from a modified calibration strategy change implemented using the engine and test cell/catalyst chamber setup illustrated in FIG. 5, and during the first and second urban driving phases of the NEDC testing protocol illustrated in FIG. 6, according to an embodiment.

FIG. 7 is a graphical representation illustrating measurements of AFR variation from a modified calibration strategy change implemented using the engine and test cell/catalyst chamber setup illustrated in FIG. 5, and during first (UDC1) and second (UDC2) urban driving phases of the NEDC testing protocol illustrated in FIG. 6, according to an embodiment. In FIG. 7, calibration change graph 700 includes AFR variation curve 702 and AFR variation curve 704 of measurements acquired from the implementation of a richness serial calibration and a richness modified calibration, respectively. Referring to FIG. 6 above, calibration change graph 700 is implemented during UDC1 612 and a portion of UDC2 614 within a time range from about zero seconds to about 300 seconds.

In some embodiments, after the richness serial calibration, the idle lean condition values close to stoichiometric are determined at the initial portion of the NEDC testing protocol. In other embodiments, the idle lean condition values close to stoichiometric are determined at the initial portion of a transient drive cycle testing protocol differing from the NEDC testing protocol, such as for example the World Harmonized Transient Cycle (WHTC), the EPA Federal Test Procedure (commonly known as FTP-75), the Japanese JC08 cycle, and the like. In an example, the idle lean condition values close to stoichiometric are determined at the initial portion of the NEDC testing protocol, e.g. at an R-value of about −0.02 from about zero seconds to about 300 seconds. In these embodiments, during the idle periods of the phase, AFR variation curve 702 exhibits substantially similar behavior near the stoichiometric point as lean and rich conditions exhibit close to stoichiometric, while AFR variation curve 704 varies and increases from lean conditions to rich conditions that are close to stoichiometric during the idle periods. This AFR variation confirms that richness modified calibration provides AFR values that improve the engine performance at cold start.

Further to these embodiments during transient events of acceleration and deceleration as well as during periods when the engine is at constant speed, the richness modified calibration provides improved engine performance. Still further to these embodiments, AFR variations as illustrated by AFR variation curve 704 exhibit more stable periods of rich condition that are close to stoichiometric, even though at times during the cycle both AFR values of richness serial calibration and richness modified calibration achieve substantially equal values thereby exhibiting no significant differences throughout the transient events.

In these embodiments, the AFR variation during richness modified calibration is associated with more advanced injection timing at the beginning of the NEDC driving cycle. As the engine warms up, injection is gradually retarded to control engine $NO_X$ emissions.

Figure 8:
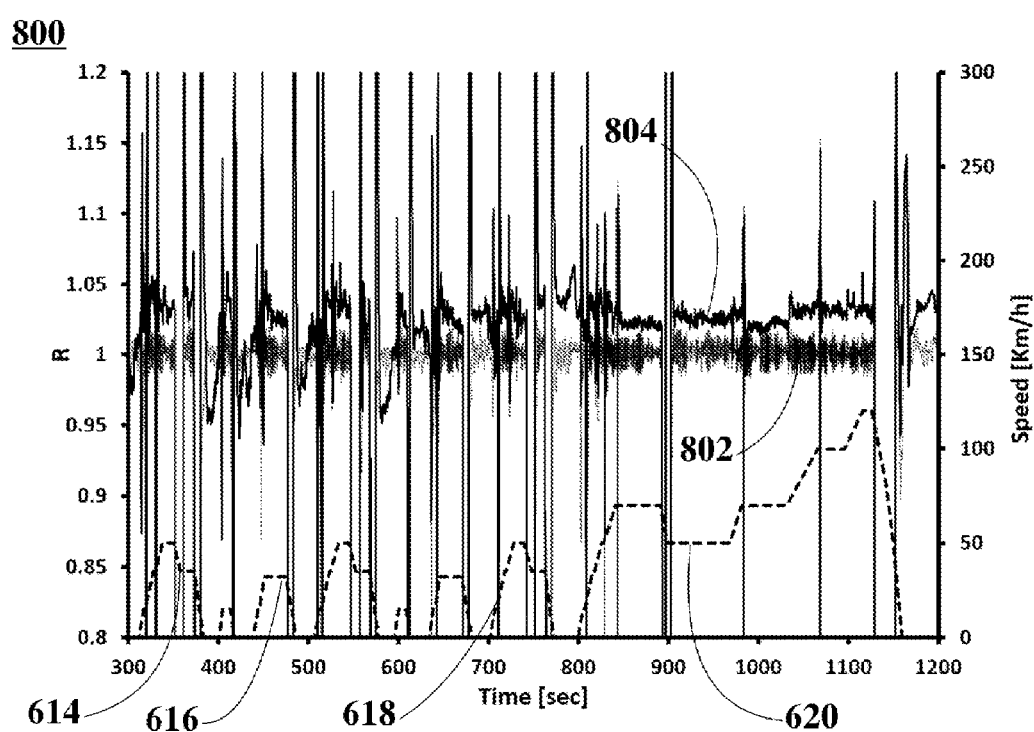
FIG. 8 is a graphical representation illustrating measurements of AFR variations from a modified calibration strategy change implemented using the engine and test cell/catalyst chamber setup illustrated in FIG. 5, and during the remaining three urban driving phases and extra-urban driving phase of the NEDC testing protocol illustrated in FIG. 6, according to an embodiment.

FIG. 8 is a graphical representation illustrating measurements of AFR variation from a modified calibration strategy change implemented using the engine and test cell/catalyst chamber setup illustrated in FIG. 5, and during UDC2, UDC3, UDC4 and EUDC phases of the NEDC testing protocol illustrated in FIG. 6, according to an embodiment. In FIG. 8, calibration change graph 800 includes AFR variation curve 802 and AFR variation curve 804 for the implementation of a richness serial calibration and richness modified calibration, respectively. Calibration change graph 800 is implemented during UDC2 614, UDC3 616, UDC4 618, and EUDC phase 620. In other embodiments, Calibration change graph 800 is implemented during phases similar to UDC2 614, UDC3 616, UDC4 618, and EUDC phase 620 in a transient drive cycle testing protocol differing from the NEDC testing protocol, e.g. the World Harmonized Transient Cycle (WHTC), the EPA Federal Test Procedure (commonly known as FTP-75), the Japanese JC08 cycle, and the like.

In some embodiments, the engine out targeted AFR is modified via the application of an offset AFR to a value slightly rich of stoichiometric condition during the remaining driving phases of the NEDC testing protocol, for example, at an R-value of about +0.02 within a range from about 300 seconds to about 1,180 seconds. In these embodiments, the AFR values provided by the modified richness calibration exhibit AFR values under rich condition and close to stoichiometric and are greater than the AFR values provided by the richness serial calibration, as illustrated by AFR variation curve 804 and AFR variation curve 802, respectively. Further to these embodiments, the slightly modified AFR values from the modified richness calibration provide a significant improvement in engine performance as well as performance of the catalyst samples of ZPGM and SPGM material compositions including a stoichiometric spinel structure.

Effects of the Modified Calibration Strategies on $NO_X$ Conversion

Figure 9:
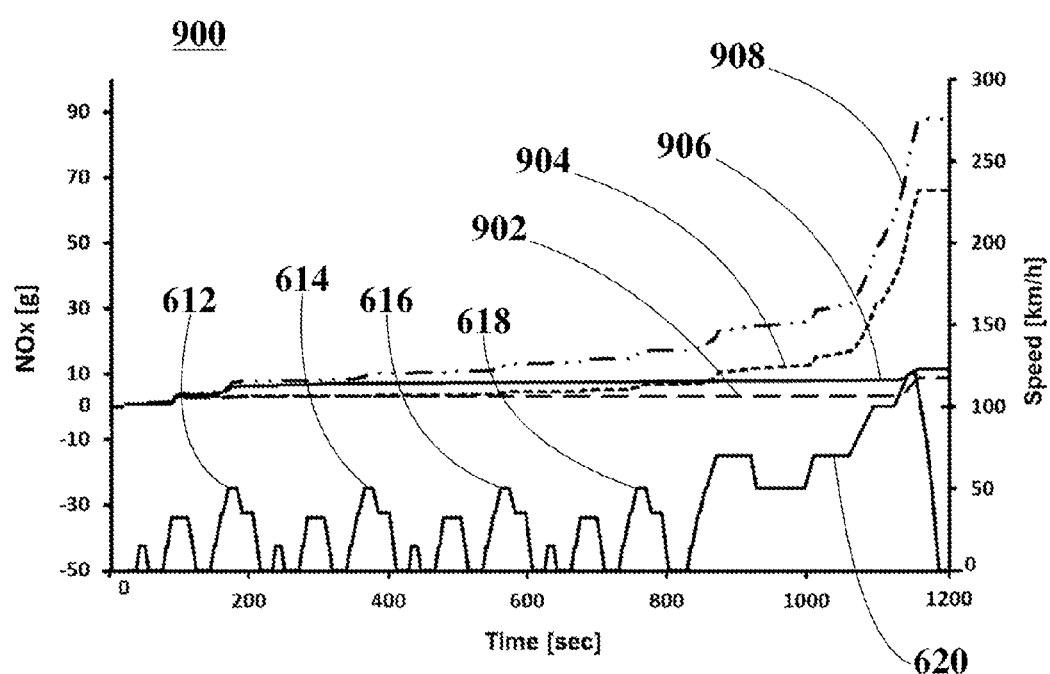
FIG. 9 is a graphical representation illustrating cumulative $NO_X$ measurements obtained during the implementation of a richness serial calibration and modified calibration strategies in conjunction with each of the catalyst samples described in FIGS. 1-4 and using the driving phases of the NEDC testing protocol illustrated in FIG. 6, according to an embodiment.

FIG. 9 is a graphical representation illustrating cumulative $NO_X$ measurements obtained during the implementation of a richness serial calibration and modified calibration strategies in conjunction with each of the catalyst samples described in FIGS. 1-4 and using the driving phases of the NEDC testing protocol illustrated in FIG. 6, according to an embodiment. In other embodiments, the driving phases used are derived from a transient drive cycle testing protocol differing from the NEDC testing protocol and are substantially similar to phases described in FIG. 6. In FIG. 9, $NO_X$ conversion comparison 900 includes conversion curve 902, conversion curve 904, conversion curve 906, and conversion curve 908. Conversion curve 902 and conversion curve 904 illustrate $NO_X$ conversions for the PGM reference catalyst under the richness serial calibration and modified calibration strategies, respectively. Conversion curve 906 and conversion curve 908 illustrate $NO_X$ conversions for the disclosed SPGM catalysts under the richness serial calibration and modified calibration strategies, respectively.

In some embodiments, the results measured from the calibration changes conducted during the NEDC testing protocol are compared to verify that the modified calibration strategies provide improved performance levels. In these embodiments, the effects of the modified calibration strategies on $NO_X$ are analyzed when the engine condition is slightly rich and after about 300 seconds so as to verify improvements in conversion efficiency.

Further to these embodiments, the effects of the disclosed modified calibration strategies on $NO_X$ are verified by comparing the cumulative grams of $NO_X$ for the PGM reference catalyst to cumulative grams of $NO_X$ for the SPGM catalysts Type B, with both $NO_X$ measurements recorded downstream at the tail pipe. In these embodiments, the cumulative $NO_X$ conversion is measured during the urban driving phases UDC1 612, UDC2 614, UDC3 616, and UDC4 618, and the extra-urban driving phase EUDC phase 620.

Further to these embodiments, during the richness serial calibration both the PGM reference catalyst (including high PGM loading of Pd) and the SPGM catalyst Type B (including low PGM loading of Pd) exhibit a level of cumulative grams of $NO_X$ conversion at less than about 11.41 grams. The level of cumulative grams of $NO_X$ for the aforementioned specific phases of the NEDC testing protocol and the associated catalysts results in the SPGM catalyst Type B exhibiting cumulative $NO_X$ greater than the cumulative $NO_X$ achieved by the PGM reference catalyst.

In other embodiments, when the modified calibration strategies are applied as illustrated in FIG. 9 a slight variation of the AFR offset value within a range of R-values from about −0.02 and +0.02 close to the stoichiometric baseline, produces greater cumulative $NO_X$ converted for the catalyst samples under comparison. In these embodiments, the cumulative $NO_X$ converted at the end of the test cycle totaled about 63.48 grams and about 85.91 grams for the PGM reference catalyst and the SPGM catalyst Type B, respectively.

Further to these embodiments, the disclosed modified calibration strategies enable a steady increase in cumulative $NO_X$ conversion. The increase in $NO_X$ conversion begins with the engine at cold start, at the initial portion of the test cycle, and gradually increasing during the rich conditions close to stoichiometric, within the remaining phases of the test cycle, to a significantly greater level of $NO_X$ conversion at the end of the test cycle.

Still further to these embodiments, it is observed that the implementation of the disclosed modified calibration strategies results in a significant improvement in catalyst performance. In these embodiments, both catalysts exhibit improved performance. However, the SPGM catalyst Type B, including low PGM loading and a Cu—Mn stoichiometric spinel structure, exhibits a greater performance during all phases of the NEDC testing protocol.

In some embodiments, significant synergies are provided by the disclosed modified calibration strategies and the spinel structure within the SPGM catalyst. In these embodiments, the synergies are verified by the increase in cumulative $NO_X$ conversion from about 11.41 grams to about 85.91 grams exhibited by the SPGM catalyst Type B. Further to these embodiments, although the PGM reference catalyst exhibited an increased $NO_X$ conversion from about 8.73 grams to about 63.48 grams, the $NO_X$ conversion for the SPGM catalyst Type B is about 35.33% greater than the $NO_X$ conversion for the PGM reference catalyst.

Figure 10:
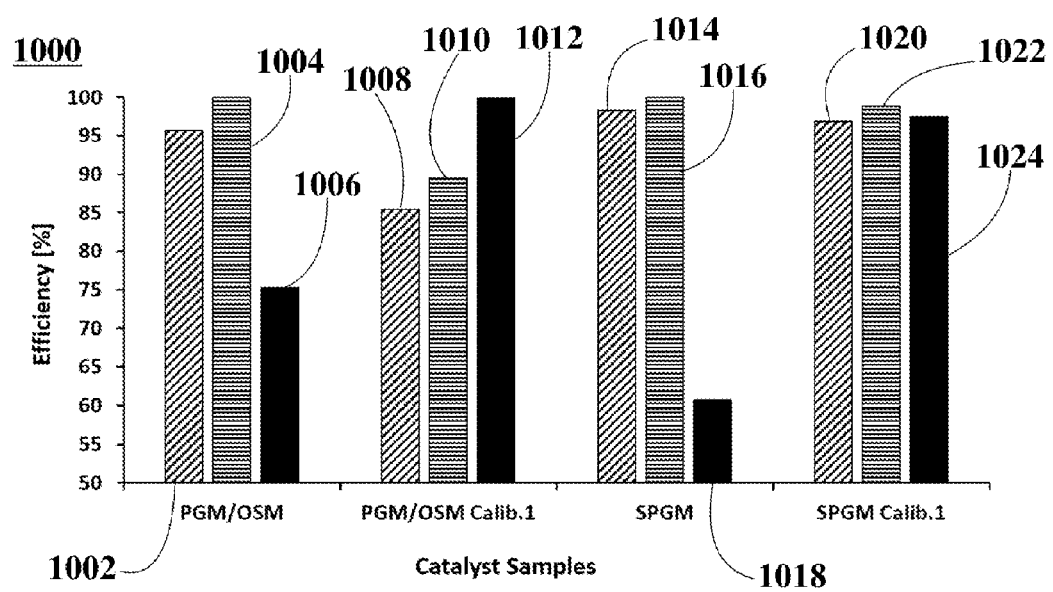
FIG. 10 is a graphical representation illustrating a comparison of NEDC conversion efficiency, for a PGM reference catalyst and SPGM catalysts Type B before and after the implementation of the modified calibration strategies, of THC, CO, and $NO_X$ during the fourth driving phase of the NEDC testing protocol as illustrated in FIG. 6, according to an embodiment.

FIG. 10 is a graphical representation illustrating a comparison of NEDC conversion efficiency, for a PGM reference catalyst and SPGM catalysts Type B before and after the implementation of the modified calibration strategies, of THC, CO, and $NO_X$, during the fourth driving phase (UDC4) of the NEDC test illustrated in FIG. 6, according to an embodiment. In FIG. 10, twelve specific conversion bars are detailed as follows: conversion bars 1002, 1004, and 1006 illustrate % THC, % CO, and % $NO_X$ conversions for the PGM reference catalyst, respectively, before the implementation of the disclosed modified calibration strategies; conversion bars 1008, 1010, and 1012 illustrate % THC, % CO, and % $NO_X$ conversions for the PGM reference catalyst, respectively, after the implementation of the disclosed modified calibration strategies; conversion bars 1014, 1016, and 1018 illustrate % THC, % CO, and % $NO_X$ conversions for the SPGM catalyst Type B, respectively, before the implementation of the disclosed modified calibration strategies; and conversion bars 1020, 1022, and 1024 illustrate % THC, % CO, and % $NO_X$ conversions for the SPGM catalyst Type B, respectively, after the implementation of the disclosed modified calibration strategies.

In some embodiments, % THC, % CO, and % $NO_X$ conversions for the PGM reference catalyst and SPGM catalyst Type B are detailed in Table 2, immediately below.

TABLE 2

% THC, % CO, and % $NO_X$ conversions for the PGM reference catalyst and SPGM catalyst Type B, as illustrated in FIG. 10.

| Type of Sample | Pollutant | % Conversion | Associated Element |
| --- | --- | --- | --- |
| PGM reference catalyst before calibration strategies | THC | 95.7 | 1002 |
| PGM reference catalyst after calibration strategies | THC | 85.4 | 1008 |
| SPGM catalyst Type B before calibration strategies | THC | 98.3 | 1014 |
| SPGM catalyst Type B after calibration strategies | THC | 96.8 | 1020 |
| PGM reference catalyst before calibration strategies | CO | 100.0 | 1004 |
| PGM reference catalyst after calibration strategies | CO | 89.5 | 1010 |
| SPGM catalyst Type B before calibration strategies | CO | 100.0 | 1016 |
| SPGM catalyst Type B after calibration strategies | CO | 98.8 | 1022 |
| PGM reference catalyst before calibration strategies | $NO_X$ | 75.3 | 1006 |
| PGM reference catalyst after calibration strategies | $NO_X$ | 99.9 | 1012 |
| SPGM catalyst Type B before calibration strategies | $NO_X$ | 60.8 | 1018 |
| SPGM catalyst Type B after calibration strategies | $NO_X$ | 97.5 | 1024 |

In these embodiments, the PGM reference catalyst exhibits greater performance (95.7% THC, 100.0% CO, and 75.3% $NO_X$ conversions) than the SPGM catalyst Type B (98.3% THC, 100.0% CO, and 60.8 $NO_X$ conversions), with the richness serial calibration during fourth driving phase (UDC4) of the NEDC testing protocol.

In other embodiments, with the modified calibration strategies, the SPGM catalyst Type B exhibits a significantly greater TWC performance (96.8% THC, 98.8% CO, and 97.5% $NO_X$ conversions) and retains high % CO and % THC conversion efficiencies, while the PGM reference catalyst (85.4% THC, 89.5% CO, and 99.9% $NO_X$ conversions) exhibits a decrease in % CO and % THC conversion efficiencies.

Figure 11:
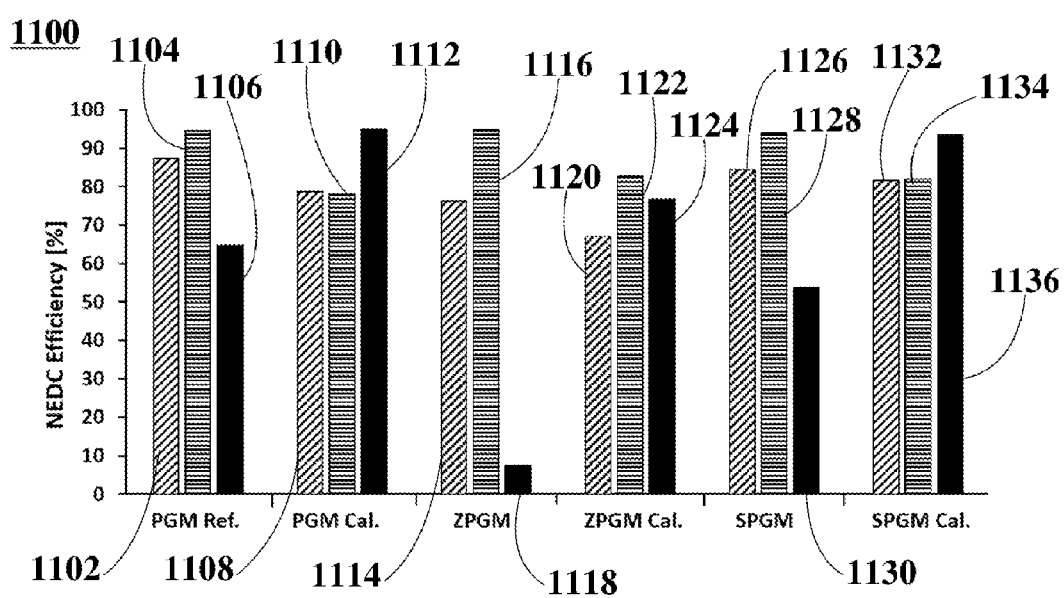
FIG. 11 is a graphical representation illustrating a comparison of NEDC conversion efficiency for a PGM reference catalyst, a ZPGM catalysts and an SPGM catalysts before and after the implementation of the modified calibration strategies of THC, CO, and $NO_X$, according to an embodiment.

FIG. 11 is a graphical representation illustrating a comparison of NEDC conversion efficiency for a PGM reference catalyst, a ZPGM catalyst Type B, and an SPGM catalyst Type B, before and after the implementation of the modified calibration strategies of THC, CO, and $NO_X$, according to an embodiment. In FIG. 11, eighteen specific conversion bars are detailed as follows: conversion bars 1102, 1104, and 1106 illustrate % THC, % CO, and % $NO_X$ conversions for the PGM reference catalyst, respectively, before the implementation of the disclosed modified calibration strategies at the end of the NEDC testing protocol; conversion bars 1108, 1110, and 1112 illustrate % THC, % CO, and % $NO_X$ conversions for the PGM reference catalyst, respectively, after the implementation of the disclosed modified calibration strategies at the end of the NEDC testing protocol; conversion bars 1114, 1116, and 1118 illustrate % THC, % CO, and % $NO_X$ conversions for the ZPGM catalyst Type B, respectively, before the implementation of the disclosed modified calibration strategies at the end of the NEDC testing protocol; conversion bars 1120, 1122, and 1124 illustrate % THC, % CO, and % $NO_X$ conversions for the ZPGM catalyst Type B, respectively, after the implementation of the disclosed modified calibration strategies at the end of the NEDC testing protocol; conversion bars 1126, 1128, and 1130 illustrate % THC, % CO, and % $NO_X$ conversions for the SPGM catalyst Type B, respectively, before the implementation of the disclosed modified calibration strategies at the end of the NEDC testing protocol; and conversion bars 1132, 1134, and 1136 illustrate % THC, % CO, and % $NO_X$ conversions for the ZPGM catalyst Type B, respectively, after the implementation of the disclosed modified calibration strategies at the end of the NEDC testing protocol.

In some embodiments, % THC, % CO, and % $NO_X$ conversions for the PGM reference catalyst, ZPGM catalyst Type B, and SPGM catalyst Type B are detailed in Table 3, immediately below.

TABLE 3

% THC, % CO, and % $NO_X$ conversions for the PGM reference catalyst ZPGM catalyst Type B, and SPGM catalyst Type B, as illustrated in FIG. 11.

| Type of Sample | Pollutant | % Conversion | Associated Element |
|---|---|---|---|
| PGM reference catalyst before calibration strategies | THC | 87.3 | 1102 |
| PGM reference catalyst after calibration strategies | THC | 78.7 | 1108 |
| ZPGM catalyst Type B before calibration strategies | THC | 76.1 | 1114 |
| ZPGM catalyst Type B after calibration strategies | THC | 67.0 | 1120 |
| SPGM catalyst Type B before calibration strategies | THC | 84.4 | 1126 |
| SPGM catalyst Type B after calibration strategies | THC | 81.5 | 1132 |
| PGM reference catalyst before calibration strategies | CO | 94.6 | 1104 |
| PGM reference catalyst after calibration strategies | CO | 78.0 | 1110 |
| ZPGM catalyst Type B before calibration strategies | CO | 94.8 | 1116 |
| ZPGM catalyst Type B after calibration strategies | CO | 82.9 | 1122 |
| SPGM catalyst Type B before calibration strategies | CO | 94.1 | 1126 |
| SPGM catalyst Type B after calibration strategies | CO | 82.0 | 1134 |
| PGM reference catalyst before calibration strategies | $NO_X$ | 64.7 | 1106 |
| PGM reference catalyst after calibration strategies | $NO_X$ | 95.0 | 1112 |
| ZPGM catalyst Type B before calibration strategies | $NO_X$ | 7.5 | 1118 |
| ZPGM catalyst Type B after calibration strategies | $NO_X$ | 76.6 | 1124 |
| SPGM catalyst Type B before calibration strategies | $NO_X$ | 53.7 | 1130 |
| SPGM catalyst Type B after calibration strategies | $NO_X$ | 93.4 | 1136 |

In these embodiments, with the richness serial calibration, the PGM reference catalyst exhibits better performance (87.3% THC, 94.6% CO, and 64.7% $NO_X$ conversions) than the ZPGM catalyst Type B (76.1% THC, 94.8% CO, and 7.5 $NO_X$ conversions) at the end of the NEDC testing protocol. Further to these embodiments, the PGM reference catalyst also exhibits better performance than the SPGM catalyst Type B (84.4% THC, 94.1% CO, and 53.7 $NO_X$ conversions) at the end of the NEDC testing protocol.

In other embodiments, with the modified calibration strategies, the SPGM catalyst Type B exhibits a significantly greater TWC performance (81.5% THC, 82.0% CO, and 93.4% $NO_X$ conversions) and retains significant % CO and % THC conversion efficiencies, while the PGM reference catalyst (78.7% THC, 78.0% CO, and 95.0% $NO_X$ conversions) exhibits a significant decrease in % CO and % THC conversion efficiencies at the end of the NEDC testing protocol.

In these embodiments, the ZPGM catalyst Type B exhibits an improved TWC performance (67.0% THC, 82.9% CO, and 76.6% $NO_X$ conversions). While % $NO_X$ conversion significantly increases from 7.5% to 76.6%, the ZPGM catalyst Type B retains significant % CO and % THC conversion efficiencies at the end of the NEDC testing protocol, when compared with the conversion efficiencies obtained for this catalyst during the richness serial calibration.

Further to these embodiments, it is observed that as a result of the implementation of the disclosed modified calibration strategies, both ZPGM and SPGM catalysts Type B, including a spinel structure, exhibit improved catalyst performance and conversion efficiency, which enables potential benefits in fuel consumption and a plurality of TWC system applications.

What is claimed is:

1. A method for optimizing the air to fuel ratio (AFR) of an engine using a transient drive cycle testing protocol, the method comprising:
   providing from a combustion engine an exhaust flow exposed to a catalyst, wherein the catalyst comprises:
   a substrate,
   a washcoat layer deposited overlying the substrate, the washcoat layer comprising a support oxide, and
   an overcoat layer deposited overlying the washcoat, the overcoat layer comprising a spinel having the general formula: $A_xB_{3-x}O_4$,
   where A and B are selected from the group consisting of Fe, Ni, Mn, Co, Cu, Al, Sr, and Zr, and x is a number from 0.1 to 2;
   testing the exhaust flow using a transient drive cycle testing protocol model comprising a plurality of urban driving cycle (UDC) phases having at least two idle phases;
   providing at least one target AFR value during each UDC phase;
   determining at least one modified AFR value during each UDC phase, wherein the at least one modified AFR value varies from the at least one target AFR; and
   adjusting one of the at least one target AFR value to correspond to one of the at least one modified AFR value during at least one of the at least two idle phases;
   wherein the at least one modified AFR value is indicative of at least one of a more lean or a more rich condition.

2. The method of claim 1, wherein the more lean condition is determined at an R-value of 0.02 from about zero seconds to 300 seconds, and in accordance with a NEDC testing protocol.

3. The method of claim 1, wherein the more rich condition is determined at an R-value of +0.02 from about 300 seconds to 1,180 seconds, and in accordance with a NEDC testing protocol.

4. The method of claim 1, wherein the conversion rate of NOx present in the exhaust stream is improved by said adjusting ones of the at least one target AFR value to correspond to ones of the at least one modified AFR value during at least one of the at least two idle phases.

5. The method of claim 4, wherein the conversion rate of NOx is improved by at least 30%.

6. The method of claim 4, wherein the conversion rate of NOx is improved by at least 90%.

7. The method of claim 1, wherein the transient drive cycle testing protocol is selected from the group consisting of the New European Driving Cycle testing protocol, the World Harmonized Transient Cycle protocol, the EPA Federal Test Procedure, and the Japanese JC08 cycle protocol.

8. The method of claim 1, wherein the transient drive cycle testing protocol comprises at least four UDC phases.

9. The method of claim 1, wherein the transient drive cycle testing protocol comprises at least one extra-urban driving cycle.

10. The method of claim 1, wherein the plurality of UDC phases are substantially equal in duration.

11. The method of claim 1, wherein at least one of the plurality of UDC phases has a duration of greater than 200 seconds.

12. The method of claim 1, wherein the plurality of UDC phases have a total duration of less than 900 seconds.

13. The method of claim 1, wherein the catalyst comprises a ZPGM catalyst or a synergized PGM catalyst.

14. The method of claim 1, wherein the support oxide is selected from the group consisting of $Al_2O_3$, $MgAl_2O_4$, $Al_2O_3$—BaO, $Al_2O_3$—$La_2O_3$, $ZrO_2$—$CeO_2$—$Nd_2O_3$—$Y_2O_3$, $CeO_2$—$ZrO_2$, $CeO_2$, $SiO_2$, alumina silicate, $ZrO_2$—$Y_2O_3$—$SiO_2$, $Al_2O_3$—$CeO_2$, $Al_2O_3$—SrO, $TiO_2$-10% $ZrO_2$, $TiO_2$-10% $Nb_2O_5$, $SnO_2$—$TiO_2$, $ZrO_2$—$SnO_2$—$TiO_2$, $BaZrO_3$, $BaTiO_3$, $BaCeO_3$, $ZrO_2$—$Pr_6O_{11}$, $ZrO_2$—$Y_2O_3$, $ZrO_2$—$Nb_2O_5$, Al—Zr—Nb, and Al—Zr—La.

15. The method of claim 1, wherein the catalyst is free of a platinum based metal.

16. The method of claim 1, wherein the overcoat layer consists of $CuMn_2O_4$ supported on a Nb-doped zirconia support oxide.

17. The method of claim 16, further comprising a second overcoat layer overlying the impregnation layer, the second overcoat layer comprising a platinum group metal.

18. The method of claim 1, wherein the catalyst further comprises an impregnation layer overlying the overcoat layer, the impregnation layer comprising a Cu—Mn spinel.

19. The method of claim 18, wherein the platinum group metal is present in a loading amount that is from about 1 $g/ft^3$ to about 10 $g/ft^3$, based on the total volume of the second overcoat layer, and wherein the second overcoat layer includes alumina as a support.

20. The method of claim 18, wherein the second overcoat layer comprises a platinum and rhodium.

\* \* \* \* \*